March 27, 1928.　　　R. F. HALL　　　1,664,295
AIRPLANE
Filed Aug. 29, 1923　　　5 Sheets-Sheet 1
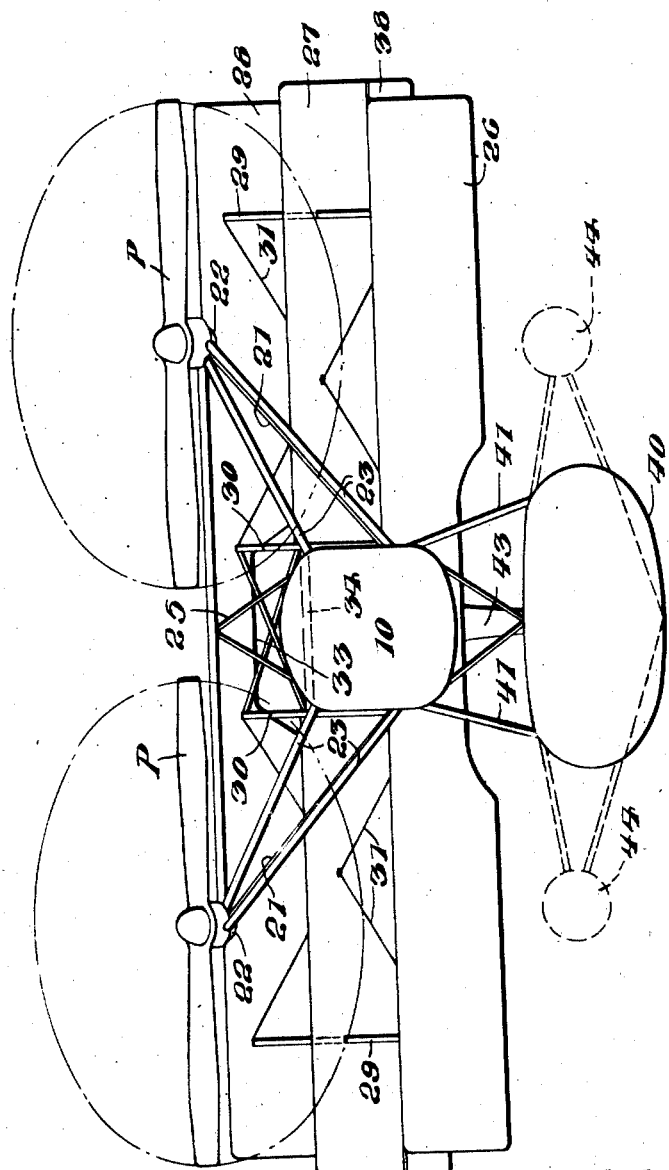

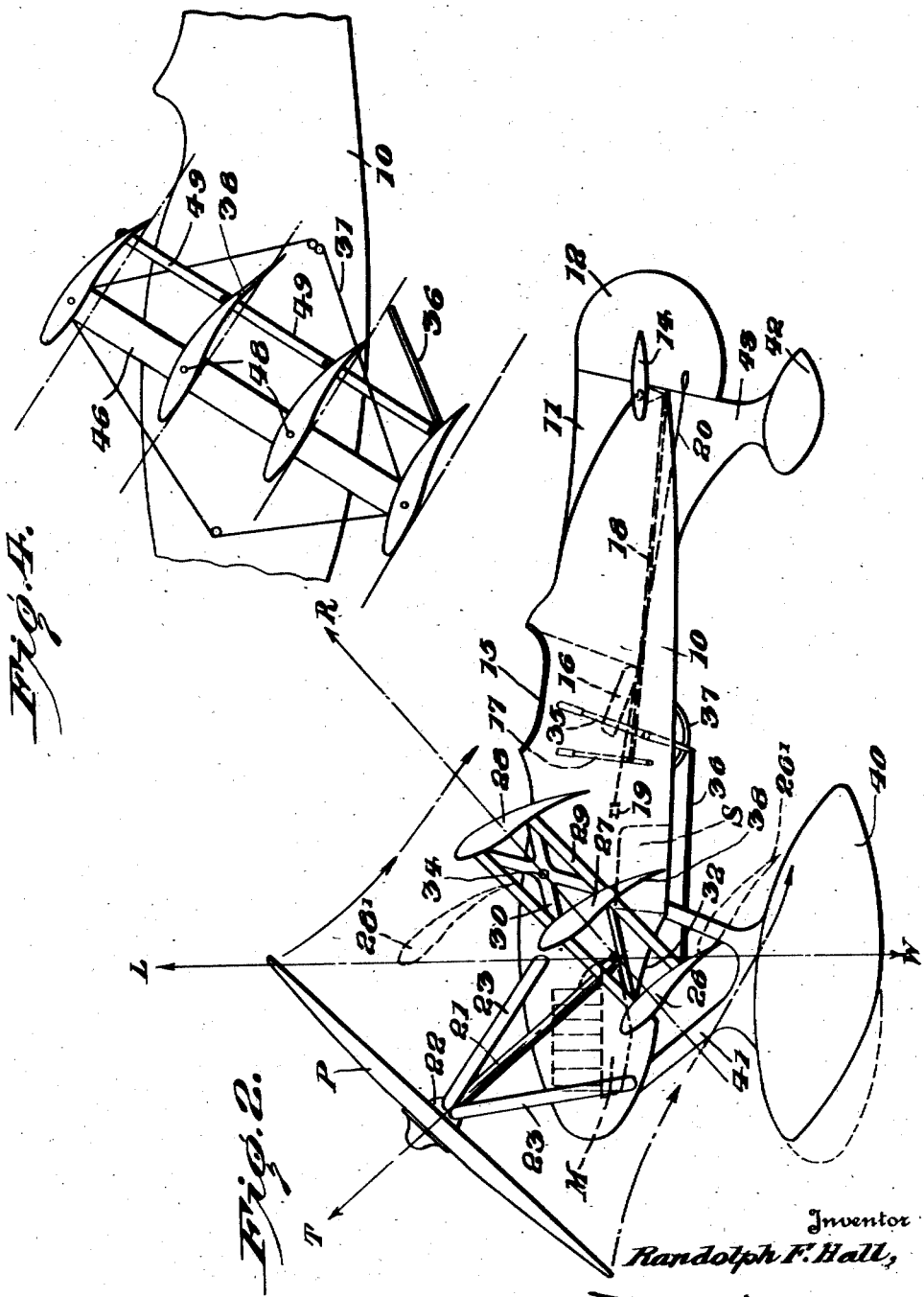

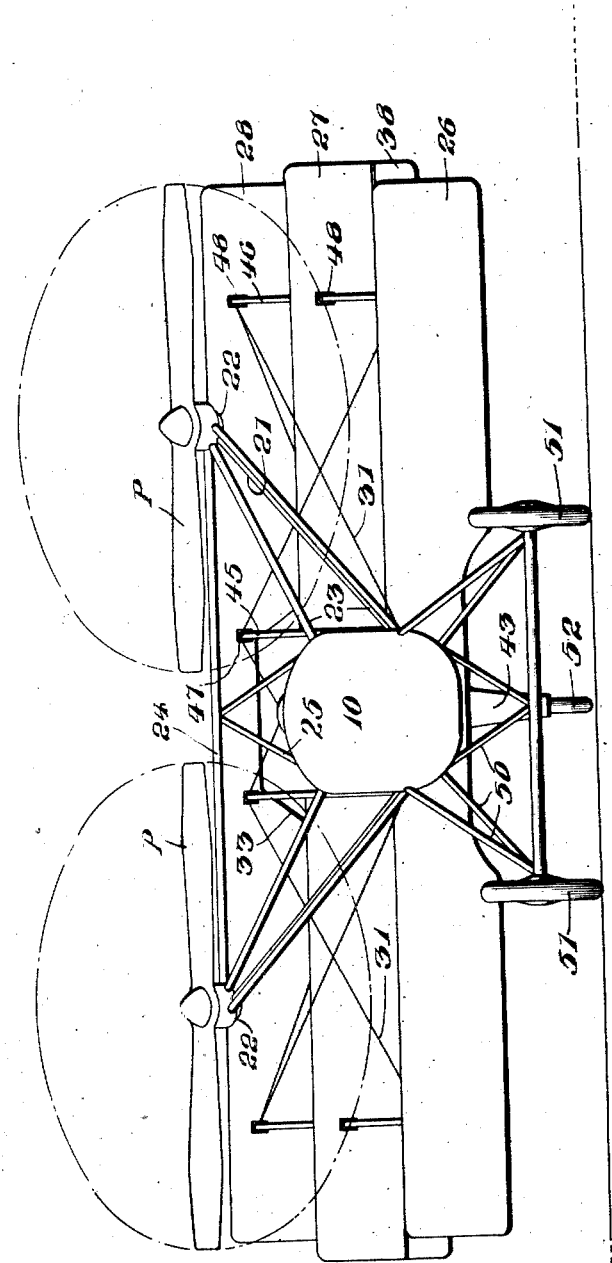

March 27, 1928.  1,664,295

R. F. HALL

AIRPLANE

Filed Aug. 29, 1923   5 Sheets-Sheet 4

Inventor
Randolph F. Hall,

Witness:
Robert F. Becker

By
Attorney

March 27, 1928.  R. F. HALL  1,664,295

AIRPLANE

Filed Aug. 29, 1923  5 Sheets-Sheet 5

Inventor
Randolph F. Hall,

Witness:
Robert F. Beck

By
Attorney

Patented Mar. 27, 1928.

1,664,295

UNITED STATES PATENT OFFICE.

RANDOLPH F. HALL, OF ITHACA, NEW YORK, ASSIGNOR OF TWENTY-FIVE ONE-HUN-DREDTHS TO THEODORE P. HALL, OF WALLINGFORD, CONNECTICUT, AND TWENTY-FIVE ONE-HUNDREDTHS TO AGNEW E. LARSEN, OF BRYN ATHYN, PENNSYLVANIA.

AIRPLANE.

Application filed August 29, 1923. Serial No. 659,987.

This invention relates to certain improvements in airplanes and more particularly to airplanes embodying the helicopter principle of vertical lift; and the nature and objects of the invention will be readily recognized and understood by those skilled in the aeronautical art in the light of the following explanation and detailed description of the accompanying drawings illustrating what I at present consider to be the preferred embodiments or aerodynamical and mechanical expressions of the invention from among various other forms, arrangements, combinations and constructions of which the invention is capable within the spirit and scope thereof.

The true vertical lift or helicopter type of heavier-than-air aircraft, hereinafter referred to generally as a helicopter or airplane of the helicopter type, is characterized generally by the derivation of direct vertical lift from an airscrew, propeller or similar medium mounted for rotation in a true horizontal plane around a vertical axis to develop sufficient static thrust in a vertical plane to create a direct vertical lift capable of overcoming the weight of the airplane to permit of vertical ascent thereof, or of sustentation with the vertical thrust or lift and weight of the airplane balanced or equal and the vertical translational movement of the airplane zero. However, to secure the above result of vertical translational movement or ascent, and sustentation or "hovering" with the vertical translational movement zero, it is essential that the power required to secure the necessary vertical thrust from the air screws or propellers be developed with a minimum weight per horsepower, and the airscrews or propellers employed have a high efficiency to most economically utilize the power, as well as to provide an efficient general design of aircraft embodying minimum weight and parasite resistance with the requisite factor of safety for the type.

There are, however, certain basic and fundamental problems of flight which must be solved by an airplane capable of vertical ascent, which problems are those of vertical lift; equilibrium; horizontal translational movement or flight in a horizontal plane; and descent or landing. In the helicopter type hereinbefore referred to the problem of direct vertical lift has been practically solved, with the advent of power plants of low weight per horsepower, driving air screws or propellers of high aerodynamic efficiency with minimum power consumption to develop a static thrust in a vertical plane resulting in a direct vertical lift of sufficient magnitude to overbalance or overcome the weight of the airplane and permit of vertical translational movement or vertical ascending flight of an airplane of this direct vertical lift or helicopter type. However, the problems of equilibrium and of horizontal translational movement or flight and of control during horizontal movement present complex and involved conditions difficult of practical solution, and these conditions are due primarily to the large unbalanced forces acting on and created by the airscrews or propellers rotating in a horizontal plane with the resulting large inertia forces from such rotating masses; and secondarily due to the design and structural difficulties encountered in the mounting and arrangement of the elements of an airplane of the helicopter or direct vertical lift type in attempting to secure equilibrium and horizontal translational movement and control thereof during horizontal movement.

Another of the fundamental problems encountered with an airplane of the true helicopter type, the solution of which is vital and essential to practical operation and flight, is the vertical descent or landing of such types of airplanes. Descent or landing may be accomplished with an airplane of the helicopter type referred to, by proper control of the power driving the airscrews or propellers, so that the weight of the craft overbalances or exerts a greater force than the propeller thrust and results in the airplane descending vertically. However, in the event of failure of the power the descent of the airplane cannot be controlled or checked and a fall out of control results. Various attempts have been made to solve this problem by the provision of aerofoils or gliding surfaces, or by designing and arranging the airscrews or propellers to form surfaces for sustaining the helicopter in a glide if the power fails, as well as by the provision of various other means and devices for securing the required results, but a practical solution of this problem which will retain in the helicopter or direct vertical lift type of airplane the required aerodynamical efficiency and performance in operation and flight is difficult due to the complex aerodynamical, design and structural problems which must be overcome.

The present invention is directed to the provision of a practical and aerodynamically efficient type of air plane capable of translational movement in a vertical plane or vertical ascent, and of a horizontal translational movement or horizontal flight, in which type of airplane the problem of vertical lift is solved in a more efficient manner than in the true helicopter type hereinbefore referred to, which derives the entire vertical lift by the direct thrust developed from an airscrew or propeller; and the provision of such type of airplane in which the further fundamental problems encountered in the helicopter type, of equilibrium; horizontal translational movement or horizontal flight, and the control during horizontal flight; and descent or landing, are efficiently solved to produce a type and design of airplane embodying the aerodynamic and flight characteristics of both the helicopter type and the conventional type of airplane with the well known inherent advantages of each type.

One of the main features and fundamental characteristics of the invention is the mounting and arrangement of an airscrew or propeller of high efficiency capable of a maximum static thrust at a low power output, so as to develop a thrust having a horizontal component and a vertical component, and the mounting of an aerofoil or lift surface in and so disposed with respect to the displacement flow or so called "slipstream" of the propeller as to be acted upon thereby and create an additional force substantially equal to and balanced by the propeller thrust and having a vertical or lift component which together with the vertical lift component of the propeller thrust will maintain equilibrium and create a resultant vertical lift of greater magnitude than the propeller thrust is capable of developing alone. Due to the foregoing characteristic of the invention the problem of vertical lift and equilibrium is solved in a more efficient manner than in the true helicopter type, as a greater lift can be developed with an increase in performance or permitting a reduction in power with resulting decrease in weight.

Another characteristic of the invention resides in applying the foregoing principle and solution of the vertical lift and equilibrium problems to an airplane of general conventional design, by mounting the propeller or propellers at an angle to the normal horizontal axis of the airplane approximately midway between the horizontal and the vertical, to develop a thrust having a horizontal or tractive component and a vertical or lift component, and by adjustably mounting and arranging the supporting surface or wing cellule in the displacement flow of the propeller or propellers so as to create an additional force substantially balancing the propeller thrust to maintain equilibrium and having a vertical component which with the vertical component of the propeller thrust develops a resultant vertical lift capable of sustaining the air plane or of permitting vertical translational movement or vertical ascent with the airplane in substantially normal horizontal flight position. An airplane embodying these characteristics is capable of vertical ascent, or of horizontal translational movement or flight by proper adjustment of the wing cellule in the displacement flow or by tilting the airplane downwardly to increase the horizontal thrust component, or by a combination of both operations. In horizontal flight the problems inherent in the helicopter type are overcome as the unbalanced forces encountered with airscrews rotating in a horizontal plane are eliminated and directional, longitudinal and lateral control is accomplished in the usual manner by the conventional tail assembly or empennage on the body or fuselage and ailerons on the wing cellule. Equilibrium and control are further aided by adjustment of the supporting surface or wing cellule in the propeller displacement flow. The helicopter descent or landing problem is eliminated without material decrease of vertical ascent performance and efficiency in an airplane having the foregoing characteristics, as in the event of power failure the air plane can be landed in the conventional glide under complete control.

Another characteristic of the invention is in the mounting of an aerofoil or aerofoils in the propeller displacement flow in accordance with the foregoing principle of the invention, so that each aerofoil is positioned and set at an angle of incidence relative to the direction of flow acting thereon, and not relative to the axis of the propeller. By this characteristic of the invention, advantage is taken of the fact that the direction of the displacement flow is not the same throughout and the maximum efficiency and lift are obtained from an aerofoil so mounted therein.

Another characteristic of the invention resides in the provision of an airplane capable of vertical ascent with pontoons or floats to form a craft capable of taking off from and landing on water, in which the pontoons or floats are of such a design and so mounted as to reduce head resistance in vertical flight to a minimum, as well as to decrease interference to control and thus increase the maneuverability of the craft in flight.

The design characteristics of the pontoons or floats is further such as to reduce and arrange the water contact areas thereof so that a minimum of fluid viscosity must be overcome in a vertical take off from water, while retaining in the design and mounting the required characteristics to permit of a horizontal take off or landing if necessary or desired.

A further feature of this invention is the embodiment of certain of the hereinbefore mentioned broad principles and characteristics of the invention in an airplane of general conventional design to permit of a reduction in wing or supporting surface area and an increase in the vertical lift, while retaining a minimum or relatively low landing speed. This feature of the invention mounts an airscrew or propeller of high efficiency with a power unit for driving the same, angularly adjustable as a unit so that the propeller can be adjusted from normal position with the thrust acting in a horizontal plane to an angular position with the thrust developing a vertical or lift component; and in accordance with the broad principle of the invention mounts an aerofoil or lift surface in the displacement flow of the propeller for angular adjustment to vary the incidence angle so that the displacement flow acting thereon creates an additional force having a vertical lift component and the downward flow of air on an aerofoil in the slip stream of an angularly disposed propeller is eliminated. In order to compensate for the moment caused by the variation of the thrust force and maintain equilibrium, this feature of the invention further provides for the simultaneous adjustment of the horizontal stabilizing surfaces upon variation of the propeller thrust angle.

With the foregoing, and certain objects and results in view which will be readily apparent to and understood by those skilled in the aeronautical art from the following description and explanation, the invention consists in certain novel features in design and in construction, arrangements and combinations of elements, as will be more fully and particularly pointed out and specified hereinafter.

Referring to the accompanying drawing:

Figure 1, is a front elevation, more or less diagrammatical, of a vertical ascent airplane embodying the invention and equipped with pontoons or floats.

Fig. 2, is a view in side elevation of the airplane of Fig. 1.

Fig. 3, is a front elevation of a vertical ascent airplane similar to Figs. 1 and 2, but equipped with a wheeled landing gear and a modified form of adjustable wing cellule.

Fig. 4, is a detail view in end or side elevation of the modified form of adjustable wing cellule shown in Fig. 3, a portion only of a body or fuselage being shown.

Figure 5:
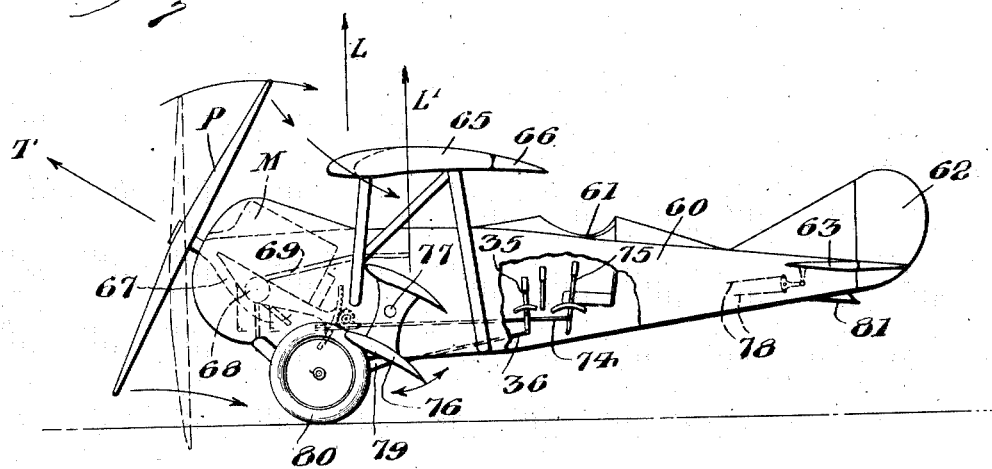

Fig. 5, is a side elevation of a modified application of certain principles of the invention and disclosing an angularly adjustable propeller and power unit, and an adjustable auxiliary wing cellule mounted in the propeller displacement flow, parts being shown broken away and other parts in dotted outline.

Figure 6:
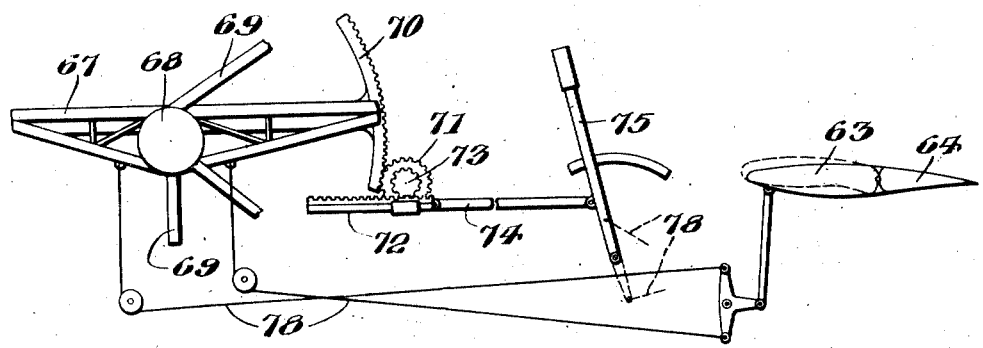

Fig. 6, is a detail diagrammatical view of the adjustable power unit bed and operating mechanism, and of the adjustable stabilizer operatively connected therewith.

Figure 7:
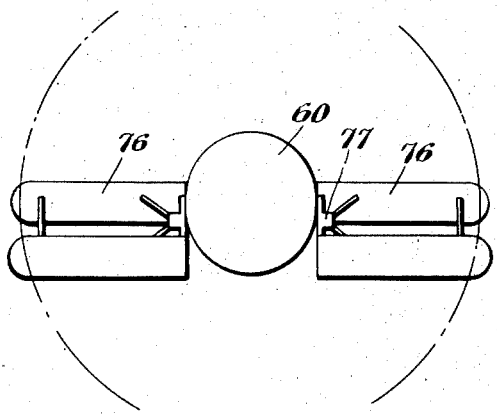

Fig. 7, is a detail diagrammatical view in front elevation of the auxiliary adjustable wing cellule of Fig. 5 mounted on a fuselage.

Figure 8:
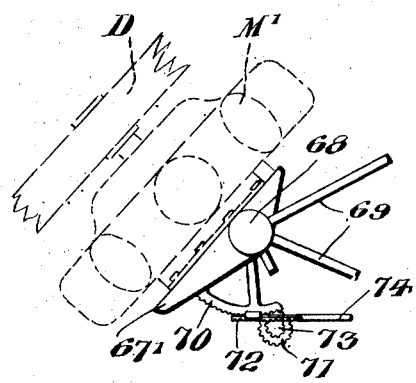

Fig. 8, is a detail diagrammatical view of an adjustable power unit bed adapted for use with a power unit of the radial or rotary types, a power unit of such type being indicated in dotted outline mounted thereon.

Figure 9:
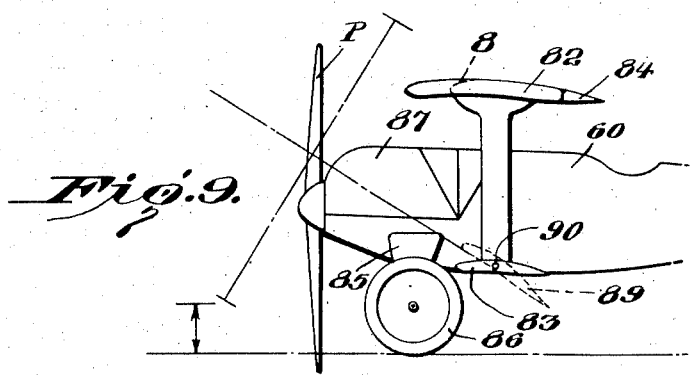
Figure 10:
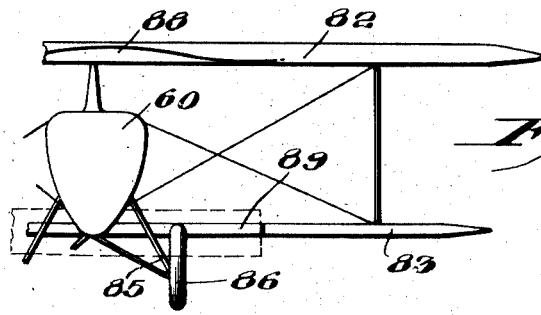

Figs. 9 and 10, are diagrammatical views of a modified type of airplane having the angularly adjustable propeller and power unit, and an adjustable lift surface or aerofoil mounted in the propeller displacement flow.

In Figs. 1 to 4 of the accompanying drawings, one possible aerodynamical and mechanical expression of certain of the broad principles and features of the invention is disclosed as embodied in and presenting an airplane having certain of the hereinbefore referred to general characteristics and capable of vertical translational movement or vertical ascent and descent, and of horizontal translational movement or horizontal flight. The illustrated forms and embodiments of the invention are presented merely by way of examples and not of limitation, for purposes of explanation and description to bring forth certain of the broad principles of the invention, and the application and results thereof. It will be clear and readily apparent to those familiar with this art, from the following description and explanation, that these principles, and features are adapted to various other aerodynamical expressions and applications thereof, other than the specific examples as shown.

The embodiment of the invention disclosed in Figs. 1 and 2 of the accompanying drawings, provides a vertical ascent airplane adopted for water use, and of a general design which substantially conforms to the design of conventional airplane types for horizontal flight familiar in this art, and characterized by a normally horizontally disposed body or fuselage with the usual tail assembly or empennage and supporting surface or wing cellule mounted thereon. In the example shown, the airplane comprises a streamline body or fuselage 10 normally horizontally disposed and of general conventional design. A tail assembly or empennage is mounted in the usual manner at the after end of the fuselage and includes the vertical fin or stabilizer 11, vertical rudder 12 for directional control, and the horizontal stabilizer and balanced elevator 14 for longitudinal control (see Fig. 2). The fuselage 10 is likewise provided with the usual control or pilot's cockpit 15 in which the control seat 16 is mounted at a considerable backward slope or inclination as shown in dotted outline in Fig. 2, for a purpose which will be explained hereinafter. The control cockpit 15 contains the usual or any other suitable control stick 17 operatively connected by push and pull tube 18 to the balanced elevator 14, and the rudder or foot bar 19 operatively connected with the vertical rudder 12 by the control cables 20, all in the usual manner and for the purposes familiar in this art.

A source of power M, such as an internal combustion motor, is in the present instance mounted in the nose or forward portion of the fuselage 10, although the invention is not limited to such position and mounting. A suitable source of fuel supply to the motor M, such as the fuel tank S shown in Fig. 2, is mounted in the fuselage 10 at any suitable or desired location thereon. The motor M is preferably of that type having a minimum weight per horsepower so as to permit of providing the airplane with maximum power while keeping the weight of the power plant as low as possible. This is an important consideration in the design of an airplane in which it is desired to secure a large static thrust from power driven airscrews or propellers to develop a vertical lift component, but can be said to be practically solved in the light of recent airplane motor developments in which power is developed at a low horsepower weight, as well known to those familiar with the aeronautical and motor arts.

According to the invention, airscrews or propellers are mounted to rotate around axes disposed approximately midway between the horizontal and the vertical although not so limited, and in the illustrated aerodynamical and mechanical adaptation of this characteristic of the invention two of such airscrews or propellers P are mounted at opposite sides of the nose or forward portion of the fuselage 10, and are dispsed for rotation in a plane inclined rearwardly with respect to the normal horizontal position of the fuselage 10, approximately midway between the vertical and the horizontal, as clearly indicated in Fig. 2 of the accompanying drawings. In the example shown in Figs. 1 and 2 of the drawings the propellers P are operatively coupled to the motor M by means of the drive shafts 21 which extend outwardly and are inclined upwardly and forwardly from the motor M in the fuselage 10. The propellers P are preferably, as in the present instance, geared to the ends of the drive shafts 21, respectively, by means of suitable gearing (not shown) or equivalent operating mechanism mounted in the gear housings 22 on and from which the propellers are respectively supported. Each gear housing 22 is mounted on and supported in position by a truss formed of the struts 23 extending from the adjacent side of the fuselage 10 and converging upwardly and outwardly to the respective gear housing, to form a substantial V supporting truss therefor. The trusses formed from the struts 23 and carrying the gear housings 22 and propellers P are connected and braced by means of a rigid member 24 extending therebetween and fixed thereto, so that a rigid supporting frame is formed by the trusses and the brace member 24. A further V truss 25 is mounted converging upwardly from the fuselage 10 to the member 24 and serves to further brace this member and the frame of which it forms a part (see Figs. 1 and 3).

In this manner the propellers P are supported in fixed position on opposite sides of the fuselage 10 for rotation around an axis inclined upwardly and forwardly with respect to the fuselage 10 approximately midway between the horizontal and the vertical, or at an angle of approximately 45 degrees, by the drive shafts 21 operatively coupled to the motor M. The propellers P are so mounted and arranged as to be rotated in opposite directions to maintain the lateral and directional equilibrium of the airplane in flight. The airscrews or propellers P are of the so called high efficiency type designed to deliver a maximum static thrust at a relatively low power output, and each of the propellers P mounted in the position with respect to the normal horizontal position of the airplane as shown and described, delivers a static thrust indicated in Fig. 2 of the drawings by the thrust vector T, inclined approximately midway between the horizontal and the vertical and having a horizontal or tractive component, and a vertical or lift component. The horizontal and vertical components of the propeller thrust T will each have a value approximately 70% of the value of this thrust when inclined at an angle of approximately 45 degrees, as illustrated in the example presented by the accompanying drawings.

The airplane of Figs. 1 and 2 is provided with a supporting surface which in the specific example shown comprises a triplane wing cellule formed of a lower wing or aerofoil 26, intermediate wing 27, and upper wing 28, mounted on the body or fuselage 10 aft of the propellers P and having a span and total gap such that the cellule as a unit lies substantially totally within the displacement flow or so called "slipstreams" of the propellers P. The wings 26, 27 and 28 of the cellule are fixed together in the desired gap relation as a unit by the outer inter-wing trusses 29, and the inner inter-wing trusses 30, respectively, the latter being adjacent to opposite sides of the fuselage 10. The inter-wing trusses 29 and 30, together with suitable brace wires 31 extending diagonally between and connecting the wings, form therewith a rigid wing cellule unit having the requisite strength with minimum of parasite resistance. The wing cellule so formed is mounted on the fuselage 10 for angular adjustment as a unit around a horizontal axis longitudinally of the cellule to permit of varying the incidence angles of the wings or aerofoils forming the same, with respect to the direction of the displacement flow and the normal horizontal flight attitude of the airplane. The upper and lower wings 28 and 26, respectively, of the cellule are formed by continuous unbroken structures extending across the fuselage above and below the same, and the intermediate wing 27 is broken and formed in two sections terminating inwardly at and adjacent opposite sides of the fuselage 10 which extends therebetween, as shown in Fig. 1 of the drawings. The under side of the fuselage 10 is preferably cut away or formed to provide a transverse recess 32 (see Fig. 2) to receive the lower wing 26, and the upper wing 28 is cut away at the trailing edge portion thereof to form an opening 33 (see Fig. 1) to receive and fit over the upper side of the fuselage 10. In this manner the range of adjustment of the wing cellule is increased and it is possible to retain continuous upper and lower wing structures with the advantages in strength resulting therefrom. Further the vision of the pilot in cockpit 15 is increased by the trailing edge or rear opening 33 in the upper wing 28.

In the specific example shown, the wing cellule is mounted for angular adjustment around a horizontal axis formed by a shaft 34 (see Fig. 1) extending transversely through the fuselage 10 and mounted and secured at its opposite ends to the wing cellule at points on the inner inter-wing trusses 30, respectively, intermediate the intermediate wing 27 and the upper wing 28. Any suitable bracing and supporting trusses can be formed in and as a part of the inter-wing trusses 30 to receive and support the ends of the shaft 34, such for example as the X truss indicated in Fig. 2 of the drawings for this purpose. The wing cellule so mounted is provided with operating mechanism for adjusting and setting the same from the control cockpit 15. As an example of such mechanism, in Fig. 2 of the drawings a control lever 35 is shown mounted in the control cockpit and pivotally coupled with the lower wing 26, or any other desired point of the wing cellule, by a push and pull rod or link 36. Suitable means for holding the wing cellule in the desired adjusted position, such as the quadrant 37 which is engaged by the control lever 35 and locks the latter in position by any of a number of well known mechanisms, is provided. Thus, the wing cellule embodying the wings 26, 27 and 28, is angularly adjustable as a unit around the axis of the shaft 34 to vary the angle of incidence of the wings forming the same, by operation of the control lever 35 in the cockpit 15.

The wing cellule is mounted on the fuselage 10 so as to be substantially totally within and acted upon by the displacement flow from the airscrews or propellers P. The displacement flow from the propellers P mounted as shown has certain characteristics which the present invention takes advantage of to secure the maximum efficiency from the aerofoils or wings of the wing cellule disposed therein. A study of the displacement flow from an airscrew or propeller reveals the fact that there is an outflow converging of the displacement stream with the result that the direction of flow in the upper and lower portions of the stream is different from that at the central portion of the stream. Therefore the invention provides for mounting the aerofoils or wings of the wing cellule at an angle of incidence relative to the direction of that portion of the displacement flow in which mounted. In accordance with this principle of the invention the aerofoils or wings 26, 27 and 28 of the wing cellule are mounted at an angle of incidence relative to the displacement flow, the direction of which is indicated generally in Fig. 2 of the drawings by the arrows from the tips of the propeller P, with the result that the upper wing 28 is mounted at a greater positive angle of incidence than the intermediate wing 27, while the lower wing 26 is mounted at substantially a negative angle of incidence with respect to the intermediate wing 27. This is clearly indicated in Fig. 2 of the drawings and is one of the basic features contributing to the efficiency of the invention, as the maximum efficiency from the wings acted upon by the displacement stream is secured.

The wing cellule formed of the aerofoils or wings 26, 27 and 28 disposed in the displacement flow at normal angles of incidence relative thereto as explained, is adjusted around the axis of shaft 34 or its equivalent, so as to bring the wings of the cellule at angles of incidence with respect to the displacement flow to secure maximum efficiency therefrom by the action of the flow thereon. In the embodiment of the invention illustrated, this position of the wing cellule is shown in Fig. 2, in which the cellule assumes a rearwardly inclined angular position with respect to the normal horizontal axis of the airplane, so the wings 26, 27 and 28 are all substantially spaced an equal distance rearwardly from the propellers P. With the airscrews or propellers P rotated by the motor M to secure maximum thrust T therefrom, the displacement flow or "slipstreams" thereof acts upon wings 26, 27 and 28 mounted in the flow and an additional force is created by the wing cellule from this action, due to the placing of the aerofoils in the displacement flow at angles of incidence thereto, as will be clear to and understood by those familiar with the reaction from an aerofoil mounted at an angle of incidence to a flow or stream of air acting thereon. This additional force so created is indicated in Fig. 2 of the drawings by the vector R, and the design and relative mounting and position on the fuselage 10 of the airscrews or propellers P and the wing cellule formed of the aerofoils or wings 26, 27 and 28, is such that the propeller thrust T and the force R created by the wing cellule in the displacement flow are approximately equal and balanced, with the result that the equilibrium of the airplane in flight is established and maintained. The force R created by the wing cellule in the propeller displacement flow has a vertical component which together with the vertical lift component from the angular position of the propeller thrust develops a resultant lift, indicated in Fig. 2 of the drawings by the lift vector L, which overcomes or overbalances the weight and resistance forces indicated by the vector W, and permits of vertical translational movement or ascent, or by control of the power and thrust to equalize and balance the lift L and weight W, permits of sustentation or "hovering" with the vertical translational movement zero.

In this manner the invention solves the problem of vertical lift in a more efficient and practical manner than in the true helicopter type deriving direct vertical lift solely from the static thrust of an airscrew or propeller acting in a vertical plane, as the resultant lift L of the invention is greater than the static thrust of the airscrews or propellers P acting alone, due to the additional lift created by the supporting surface formed by the wing cellule disposed in the displacement flow as shown and explained. This feature of the invention permits of vertical ascent and descent in an airplane conforming to the general conventional design of horizontal flight airplanes while retaining in the airplane the necessary characteristics required for normal horizontal flight, without the difficulties encountered in attaining horizontal flight with a true direct vertical lift or helicopter type. In the embodiment of the invention disclosed in Figs. 1 to 3, vertical flight is performed with the body or fuselage 10 in substantially normal horizontal attitude and the pilot in the control cockpit is in normal position with the full advantages in vision obtained in horizontal flight. The tail assembly or control surfaces forming the conventional empennage and mounting thereof on the body 10 do not interfere with vertical flight as the balanced horizontal stabilizer 14 is mounted for movement to position in a vertical plane during vertical movements of the airplane, and the body or fuselage 10 being of streamline longitudinal contour will not offer prohibitive head resistance when moving in a lateral or sidewise direction, as will be clear to those skilled in this art.

The problem of horizontal flight and control in an airplane capable of flight in a vertical plane, is efficiently solved by the type of airplane as disclosed embodying the foregoing principles and design features of the invention. To secure horizontal translational movement the entire airplane can be tilted or nosed downwardly to increase the horizontal or tractive components of the propeller thrust and simultaneously reduce the rear horizontal components of the wing cellule, or by angular adjustment of the displacement flow to reduce the rear horizontal components thereof. Further, by a combination of both the above operations of tilting the airplane forwardly and adjusting the wing cellule, horizontal translational movement can be secured, as will be apparent from the foregoing description and explanation of the accompanying drawings. In horizontal flight longitudinal equilibrium is secured by the proper proportioning and positioning of the aerofoils or wing cellule in the displacement flow and the relative positioning of the other elements of the airplane to properly locate the center of gravity with respect to the other forces on the airplane. Further, longitudinal control and equilibrium is aided by proper adjustment of the wing cellule. It is to be noted that the axis around which the wing cellule is rotatable, is not limited to the position shown, as any position structurally convenient to the wing cellule and fuselage may be used. The location of the axis of the angularly adjustable supporting surface or wing cellule will influence the control leverages and forces acting on the control mechanism, for example, in a mounting where the force R passes through the pivot point control is balanced and should the thrust vector T also pass through the pivot point or axis, the angular adjustment of the wing cellule would have but small effect upon the longitudinal equilibrium of the airplane. During horizontal flight the displacement flow will have a tendency to flatten out and the wing cellule can be adjusted to reduce the incidence angles and thus increase the vertical component of the force R acting on the cellule. Lateral control in flight is obtained through the provision of the usual ailerons 38 shown as mounted on the intermediate wing 27 of the wing cellule, although the invention is not limited to any particular mounting or type of lateral control medium. The rudder 12 provides directional control, while the rotation of the propellers P in opposite directions maintains the airplane in lateral and directional equilibrium or stability. Longitudinal control in horizontal flight is secured by the balanced elevator 14, aided by angular adjustments of the wing cellule in the displacement flow as previously referred to. The pilot's seat 16 is preferably given a considerable rearward inclination so that with the body of the airplane tilted downwardly in horizontal flight or in gliding, the pilot will be in a normal and natural attitude for proper control operation of the airplane.

From the foregoing it will be apparent that by the proper design and structural applications and adaptations of the broad principles and features of the invention, a type of airplane is provided capable of efficient vertical ascent or flight, and of efficient horizontal flight. Attention is here directed to the fact that the supporting surface or aerofoils disposed in the displacement flow from the airscrews or propellers, are not limited to the number, arrangement or mounting disclosed by the wing cellule of the illustrated example, the essential feature and broad principle of the invention being present in any arrangement of supporting surface or aerofoils in the displacement flow which creates the additional force R approximately equal to and balancing the propeller thrust T, to develop the additional vertical component or lift which with the vertical component from the angular direction of the thrust T establishes the resultant lift L to overcome the weight W. As illustrative of another possible arrangement of supporting surface, the aerofoils 26' and 28' are diagrammatically disclosed in dotted outline in Fig. 2 of the drawings, with the leading edges thereof in substantial vertical alinement and positioned at the proper angles of incidence relative to the displacement flow so as to secure the required additional force R in the manner hereinbefore explained.

It is obvious the angle of incidence of a wing may vary throughout the span and the wing may also be set at a dihedral angle in accordance with common practice. Proper varying incidence would likely afford a more uniform lift by counteracting the unequal forces on a wing caused by the displacement flow of a revolving propeller as for example: A descending revolving propeller blade relative to a rearward proximate aerofoil surface will produce a lift force of less magnitude than the ascending blade, unless by outside influence such as the employment of the preceding variable incidence or twist, this difference is compensated.

The vertical ascent type of airplane embodying the invention, is capable of vertical take off and vertical ascent, as well as vertical descent and landing. In vertical descent the power is controlled to reduce the thrust T and thereby reduce the lift L to a point where the weight W is greater than and overcomes the lift, with the result that the airplane descends vertically but under complete control of the pilot. The rate of speed of this descent is readily controlled through varying the power applied to the propellers P from motor M. In the event of power failure the airplane can be landed under control by gliding or volplaning in the usual manner employed with the conventional type of airplane, due to the characteristics and qualities retained by the design of the invention which permit of horizontal flight and control.

In the airplane of Figs. 1 and 2 of the drawings, provision is made for taking off from and landing on water, and consists of an undercarriage or landing chassis of the pontoon or float type. The design and mounting of these floats to permit of efficient vertical take off and landing from and onto a body of water, and to further permit of a horizontal take off or landing if desired, is another important feature of the invention. In the aerodynamical and mechanical expression of this feature disclosed in Figs. 1 and 2, a single main pontoon or float 40 is suspended below and spaced from the forward portion of the fuselage 10 by the streamline V trusses 41, in the usual or any other desired manner; and a small tail float or pontoon 42 is mounted on a streamline structure 43 depending downwardly from the tail portion of the fuselage 10. The main pontoon or float 40 is of relatively short length and a width such as to protrude or extend a minimum distance laterally beyond the sides of the fuselage thereabove, and is so positioned and mounted as to be substantially covered by the fuselage 10 and wing cellule thereabove. In this manner head resistance from the float or pontoon 40 in vertical ascent is reduced to a minimum. The water contact surface of the pontoon 40 is preferably curved and arranged so as to reduce the fluid viscosity which must be overcome in a vertical take off from water to as low a value as possible. The depth of the pontoon 40 may be likewise made as small as practical to reduce side area and thereby increase the maneuverability of the airplane in flight, and the side contour streamlined to reduce resistance in flight. The small rear or tail pontoon 42 is designed to embody the above characteristics, and both pontoons are preferably of hollow metal formation, provided if necessary with suitable vent tubes (not shown) to prevent the creation of a vacuum with the pontoons in contact with and resting upon a body of water. The under surface of the pontoons is curved upwardly at the front and rear thereof to permit of making a horizontal take off or landing by planing on the surface of the water, as will be readily understood. The pontoons are not limited to the shape above described, as for example, the main pontoon 40 can have a V shape bottom in cross section as indicated by the dotted lines in Fig. 1 of the drawings, or the nose or forward end can be of streamline shape as shown in dotted lines in Fig. 2 of the drawings. Under certain circumstances or conditions of operations, or of design, outrigged auxiliary pontoons or floats 44 can be provided on the main pontoon or float 40, as indicated in dotted outline in Fig. 1 of the drawings. With pontoons or floats properly designed it would be possible in case of necessity to make a vertical landing on land with the airplane of Figs. 1 and 2.

A modified mounting and arrangement of the aerofoils or wings 26, 27 and 28 to form the wing cellule disposed in the displacement flow is shown in Fig. 3 of the drawings, together with Fig. 4 in which a multiplane cellule consisting of four aerofoils or wings is shown so mounted. In this form of the wing cellule the aerofoils are individually pivotally mounted to form a stationary truss extending from the fuselage 10, of which truss only the inner vertical struts 45 and outer vertical struts 46 together with brace wires 31, are seen, the longitudinals being enclosed within the confines of the wing covering. The struts 45 and 46 extend through the wings of the cellule which are pivoted thereto at the series of points 47 and 48, respectively. In Fig. 4 a four wing cellule is shown together with a portion of the operating mechanism for rotating the wings on their pivots. This mechanism is the same as employed for the triplane cellule of Fig. 3, and consists of a series of links 49 extending between and connecting adjacent wings of the cellule, and the push and pull rod 36 pivotally connected with a wing of the cellule for operation by the control lever 35 in the cockpit hereinbefore described. Thus, by actuating the rod 36, the wings of the cellule can be rotated on their pivots to change the angles of incidence in the displacement flow for an equivalent purpose and results as explained in detail with respect to the rigid unit cellule of Figs. 1 and 2, of the drawings.

It is evident that in the foregoing type of truss, the interaerofoil links (49) may be located in relation to the individual wing pivots (48) to vary the relative angular operation of the individual wings. Furthermore by rigidly securing one or more aerofoils or wings and by disconnecting or removing their respective operating links, the same aerofoil or aerofoils may be non-operative and therefore fixed in relation to the axis of the airplane while the remaining operatively connected surfaces are actuated in the usual manner. It is also contemplated that under certain structural conditions and arrangements, to wit: very large operative unbalanced areas; that areas or elements thereof be operated separately or collectively by separate individual control mechanisms, as disclosed hereinbefore to obtain a greater degree of controllability or to reduce forces imposed upon the control mechanisms.

The airplane of Fig. 3 of the drawings embodying the invention, is provided with an undercarriage designed for landing use, which comprises the main forward chassis of more or less conventional design including the supporting trusses 50 and landing or ground wheels 51 and the rear or tail chassis comprising the landing wheel 52 mounted and supported upon the structure 43 depending from the rear portion of the body in a manner previously referred to.

A modified application and embodiment of certain of the broad principles of the invention hereinbefore described and explained, is disclosed in Figs. 5, 6, 7 and 8, of the accompanying drawings. As a specific example of this application, a conventional design and type of airplane is illustrated, comprising the body or fuselage 60 having the pilot's cockpit 61 and the tail assembly or empennage including the vertical fin and rudder 62, adjustable horizontal stabilizer 63 and elevator 64. A monoplane wing 65 of the parasol type having lateral control surfaces or ailerons 66 is mounted on and forms the supporting surface for the airplane, in the usual manner. One feature of this application of the invention resides in mounting the power plant or motor M and propeller P for angular adjustment as a unit to permit of varying the propeller thrust angle. This is accomplished by providing a motor bed 67 pivotally mounted on bearings 68 supported at opposite sides of the forward or nose portion of the fuselage 60 in the fixed trusses or frames 69 thereof. The propeller P is mounted on and driven from the motor M in the usual or any desired manner so as to be movable and angularly adjustable therewith as a unit.

The mechanism for rotating the motor bed 67 on its pivots 68 to angularly adjust the motor M and propeller P as a unit is more or less diagrammatically illustrated in Fig. 6 of the drawings. An arcuate or curved rack bar 70 is fixed in vertical position at the rear or after end of the motor bed 67 and meshes with a gear 71. A rack 72 is mounted for horizontal reciprocation and meshes with a gear 73 which is fixed to rotate with the gear 71 in mesh with the motor bed rack 70. A link or push and pull rod 74 is pivotally coupled to and connecting the rack 72 with the operating lever 75 mounted in the pilot's or control cockpit 61. Thus, by means of the lever 75, the rack 72 can be reciprocated to rotate the gears 71 and 73 to rotate the motor bed 67 and angularly adjust the motor M and propeller P as a unit, with the resulting variation or change in the direction of the propeller thrust. The normal horizontal position of propeller P to deliver a horizontal or tractive thrust is indicated by dotted lines in Fig. 5 of the drawings.

In accordance with the invention in the present embodiment thereof, auxiliary aerofoils forming wing cellules 76 are pivotally mounted at 77 on and extending from opposite sides of the fuselage 10 in longitudinal alinement, beneath the monoplane wing 65 in the propeller displacement flow. (See Figs. 5 and 7.) Suitable means similar to that described with reference to Figs. 1 and 2 including control lever 35 and link 36, is provided for adjusting the wing cellules 76 to vary the angles of incidence thereof in the displacement flow. The aerofoils forming the wing cellules 76 are disposed in the displacement flow as hereinbefore described, that is, at angles of incidence relative to the flow and not the axis of the propeller. In order to compensate for the moment caused by the variation of the propeller thrust force about the center of gravity of the airplane, the adjustable horizontal stabilizer 63 is operatively connected with either the motor bed 67 by operating cables 78, or by means of cables 78 to the control lever 75 (see Fig. 6) mounted in the fuselage cockpit 61, so that adjustment of the motor and propeller P to vary the thrust angle with respect to the horizontal axis of the airplane, results in simultaneous adjustment of the horizontal stabilizer to the proper angle to compensate for the change in thrust direction, and maintain the equilibrium of the airplane under all conditions.

With an airplane embodying the foregoing features, the horizontal take off distance can be materially reduced by adjusting the propeller so that the thrust is inclined upwardly from and at an angle to the vertical to develop a vertical lift component, and by adjusting the wing cellule 76 in the displacement flow as to create a lift L' in addition to the lift L of the wing 65 and of the vertical component of the propeller thrust. Further, it is possible to decrease the supporting surface area and increase the speed of the airplane, while retaining a safe and reasonable landing speed due to the angularly adjustable propeller P and the adjustable wing cellules 76 mounted in the displacement flow. If desired the main supporting surface or wing 65 can be cut away at the leading edge portion in the displacement flow to reduce interference, as indicated in dotted lines in Fig. 5 of the drawings, or sweep forward wing provided.

The airplane of Fig. 5 is provided with the conventional design of undercarriage or chassis including the supporting trusses 79 and landing or ground wheels 80 mounted below the forward portion of the fuselage, and the tail skid 81 mounted at the rear or tail portion of the fuselage. Due to the angularly adjustable propeller P it is possible to mount the landing wheels 80 in close proximity to the fuselage 60 and thus shorten the trusses 79 and reduce head or parasite resistance which is a considerable factor in the conventionally mounted chassis. This is possible because in taking off and in landing the propeller is in upwardly inclined position and ground clearance is obtained with the chassis mounted as described even where the normal horizontal position of the propeller P in flight would not give this clearance. This will be readily apparent by reference to the drawings in connection with the foregoing description. Referring to the angularly adjustable motor bed 67 with the motor M thereon, attention is directed to the fact that the bed is preferably pivotally mounted slightly forward of its center of gravity. It will be further noted that the cowl for the motor M is movable therewith in such a manner as to protect the motor and streamline the same as much as possible in all positions thereof. This is clearly shown by Fig. 5 of the drawings, as well as Fig. 9 described hereinafter.

An angularly adjustable bed or mount 67' for motors of the radial or rotary types is more or less diagrammatically illustrated in Fig. 8 of the drawings with such type of motor M' mounted thereon. The mounting and arrangement of the motor bed 67' is analogous to that for the motor bed 67, with the exception that the bed 67' in normal horizontal propeller thrust position is disposed substantially vertically so that the curved rack 70 is fixed at the forward lower end and extends substantially in a horizontal plane in normal position. The bed adjusting and operating mechanism is the same as that of the motor bed 67 described with reference to Figs. 5 and 6 of the drawings.

Another application of the angularly adjustable propeller and motor unit, is diagrammatically illustrated in Figs. 9 and 10 of the accompanying drawings. In this embodiment an airplane including the more or less conventional design of body or fuselage 60 and biplane or semi-biplane wing cellule comprising the upper wing 82 and lower wing 83, the upper wing being provided with the usual lateral control surfaces or ailerons 84, is shown. A landing chassis comprising the supporting trusses 85 and wheels 86 is mounted in the conventional manner on the fuselage 60, and a motor (not shown) and propeller P are mounted for angular adjustment in the same manner as described with reference to the motor M and propeller P of Figs. 5 and 6. The motor cowl 87, diagrammatically shown in Fig. 9, is so formed and arranged as to move with the motor to cover and streamline the same as much as possible in all positions of the motor and propeller P, as hereinbefore referred to. The upper wing 82 is cut away at the major portion of the leading edge within the displacement flow or "slipstream" of the propeller to form the rearwardly extending recess 88. The lower wing 83 has the central portion 89 thereof within the propeller displacement flow pivotally mounted for rotation around a longitudinal axis 90 to vary the angle of incidence thereof. Any suitable or desired operating mechanism (not shown) can be provided for adjusting the lower wing section 89, such for example as the operating mechanism shown and described with reference to the wing cellule 76 of Fig. 5. By the provision of the variable incidence section 89 of the wing 83 within the propeller displacement flow an additional vertical lift can be obtained in accordance with the principle of the invention explained in connection with the wing cellules 76 of the airplane disclosed in Fig. 5. The position of the propeller P and its axis and thrust in one position of adjustment, is diagrammatically indicated by broken lines in Fig. 9 of the drawings, and the position of the wing section 89 adjusted to position cooperating with the displacement flow from the propeller in adjusted vertically inclined position, is likewise indicated in dotted outline in this figure of the drawings. The operation and results obtained from the embodiment of the invention of Figs. 9 and 10, is similar to that explained and described in connection with the embodiment of Fig. 5, and consist essentially of an increase in speed in normal flight, while retaining a relatively low landing speed, and a decrease in the horizontal run required in taking off.

Attention is directed to the fact that the broad principles and features of the invention embodied and presented in the design and arrangement of airplane disclosed in Figs. 1 to 3 of the drawings, are not limited to any particular number of airscrews or propellers or the means for driving the same, or limited to any number or arrangement of aerofoils mounted in the displacement flow, as it will be recognized by those skilled in this art that these principles and features can be presented in a variety of ways other than disclosed in the illustrated examples herewith. While in the example of the invention presented herein by Figs. 1 to 3, the axis of propeller rotation is disclosed and referred to as approximately midway between the vertical and horizontal, the invention is not limited to any particular angle of propeller axis inclination in the broad aspects of the invention, as angles of inclination of any degree can be employed, and are contemplated by and included in the scope of the invention as set forth in the appended claims.

In the appended claims the term "airplane" is employed in a broad, generic sense to include any and all aircraft capable of embodying and presenting the broad principles and features of the invention, while the term, "propeller" is used in the claims for purpose of clearness and uniformity of expression, to include airscrews and all means or medium for developing a static thrust and displacement flow or stream of air.

It is also evident that various changes, modifications, variations and substitutions might be resorted to without departing from the spirit and scope of the invention, and hence I do not desire to limit myself to the exact disclosures hereof.

Desiring to protect my invention in the broadest manner legally possible, what I claim is:

1. In an airplane, laterally spaced propellers mounted to develop a combined thrust having a horizontal and a vertical component, and an aerofoil mounted with substantially the entire area thereof disposed in and subjected to the combined propeller displacement flow, said aerofoil arranged at such an angle of incidence to the displacement flow, and acted upon thereby to develop an additional force having a vertical component which together with the vertical thrust component establishes a resultant vertical lift capable of sustaining the airplane.

2. In an airplane, in combination, a propeller mounted to develop a thrust having a horizontal component and a vertical component, and an aerofoil mounted with the major area thereof in the propeller displacement flow and acted upon thereby to develop an additional force substantially equal to and balancing the propeller thrust and having a vertical component which together with the vertical thrust component develops a vertical lift for sustaining the airplane.

3. In an airplane, a propeller mounted to deliver a thrust having a horizontal component and a vertical component, a supporting surface for the airplane mounted disposed with the major area thereof in the propeller displacement flow and acted upon thereby to create an additional force having a vertical component which with the vertical thrust component develops a resultant vertical lift for sustaining the airplane and a horizontal component substantially equal to and balancing the horizontal thrust component to maintain the airplane in equilibrium, and control means for changing the direction of propeller thrust to increase the horizontal component and reduce the vertical component thereof to cause horizontal translation of the airplane.

4. In an airplane, a normally horizontally disposed fuselage, a propeller mounted to deliver a thrust having a horizontal component and a vertical component, a supporting surface for the airplane mounted with substantially the entire area thereof in the propeller displacement flow and acted upon thereby to create an additional force substantially equal to and balancing the propeller thrust to maintain the airplane in equilibrium and having a vertical component which with the vertical thrust component develops a resultant vertical lift for vertical translation of the airplane with the fuselage in normal horizontal position.

5. In an airplane, a normally horizontally disposed fuselage, control surfaces mounted thereon, a propeller mounted to deliver a thrust having a horizontal component and a vertical component, a supporting surface for the airplane mounted in the propeller displacement flow and acted upon thereby to create an additional force substantially equal to and balancing the propeller thrust to maintain the airplane in equilibrium, the additional force so created having a vertical component which together with the vertical component of the thrust develops a resultant vertical lift for vertical translation of the airplane with the fuselage in substantially normal horizontal position, and said control surfaces operable to change the direction of the propeller thrust and increase the horizontal component thereof to cause horizontal translation of the airplane.

6. In an airplane having a normally horizontally disposed fuselage, a supporting surface, and control surfaces; a propeller mounted to deliver a thrust having a horizontal component and a vertical component, the supporting surface for the airplane mounted in the displacement flow from the propeller and acted upon thereby to create an additional force substantially balancing the propeller thrust, the additional force so created having a vertical component which combined with the vertical thrust component develops a resultant lift of sufficient magnitude to result in vertical translation of the airplane, and the control surfaces so mounted that by operation thereof to tilt the fuselage and change the direction of the thrust to increase the horizontal tractive component thereof the airplane is capable of horizontal translation with the control surfaces operative to control the airplane during such movement.

7. In an airplane, a propeller mounted to deliver a thrust having a horizontal component and a vertical component, and an aerofoil adjustably mounted with substantially the total area thereof in the propeller displacement flow and acted upon thereby to develop an additional force having a vertical component which with the vertical thrust component develops a resultant vertical lift for vertical translation of the airplane, the said aerofoil adjustable to vary the angle of incidence thereof in the displacement flow and increase the horizontal thrust component while reducing the vertical component to cause horizontal translation of the airplane.

8. In an airplane, a normally horizontally disposed fuselage, an empennage mounted thereon, a propeller mounted to deliver a thrust having a horizontal component and a vertical component, and a supporting surface disposed in the propeller displacement flow and acted upon thereby to create an additional force substantially balancing the propeller thrust and having a vertical component which with the vertical component of the thrust develops a resultant lift force for vertical translation of the airplane, the supporting surface adjustable to vary the angle of incidence thereof to the displacement flow and reduce the force created thereby to cause a horizontal translational movement of the airplane, and the empennage operative for controlling the airplane during horizontal movement.

9. In an airplane a normally horizontally disposed fuselage, an empennage including longitudinal and directional control surfaces, a propeller mounted to deliver a thrust having a horizontal component and a vertical component, a supporting surface for the airplane mounted in the propeller displacement flow and acted upon thereby to create an additional force having a vertical component which together with the vertical thrust component develops a resultant vertical lift for vertical translation of the airplane with the fuselage in substantially normal horizontal position, and the said supporting surface adjustable to vary the angle of incidence thereof in the displacement flow and reduce the force created thereby to increase the horizontal translational movement of the airplane, the longitudinal control surface of the empennage operable to cause change in the direction of thrust to further increase the horizontal thrust component and tractive effect thereof, and the control surfaces of the empennage operable to control the airplane during horizontal movement.

10. In an airplane including a normally horizontally disposed fuselage, a propeller mounted to deliver a thrust at an angle inclined upwardly to the longitudinal axis of the fuselage, and a supporting surface disposed with the major area thereof in the propeller displacement flow, said surface at an angle of incidence such that an additional force is created thereby substantially equal to the propeller thrust force and maintaining the airplane in longitudinal equilibrium.

11. In an airplane including a normally horizontally disposed fuselage, a propeller mounted to deliver a thrust at an angle to the longitudinal axis of the fuselage and having a vertical component and a horizontal component, and a supporting surface disposed in the propeller displacement flow at an angle of incidence such that an additional force is created substantially equal to the propeller thrust and having a vertical lift component which with the vertical thrust component develops a resultant lift force capable of imparting vertical translational movement to the airplane, and the said supporting surface adjustable to vary the angle of incidence in the displacement flow and change the magnitude of the additional force created thereby.

12. In an airplane, a propeller mounted to deliver a thrust having a horizontal component and a vertical component of substantially equal magnitude, and an aerofoil disposed in the propeller displacement flow at an angle of incidence thereto for developing an additional force substantially equal to the thrust force and maintaining the airplane in equilibrium, the aerofoil adjustable to change the angle of incidence and reduce the additional force below the magnitude of the thrust force.

13. In an airplane, a normally horizontally disposed fuselage, an empennage, a supporting surface, a propeller mounted to deliver a thrust at an angle inclined upwardly to the longitudinal axis of the fuselage, said supporting surface mounted in the propeller displacement flow at an angle of incidence thereto to develop an additional force having a lift component which with the thrust lift component imparts vertical translation to the airplane with the fuselage in normal horizontal position, the said supporting surface adjustable to change the incidence angle thereof in and to the displacement flow and reduce the lift component thereof, and said empennage operable to incline the longitudinal axis from normal position and increase the horizontal tractive effect of the propeller thrust for horizontal translation of the airplane.

14. In an airplane, a propeller mounted with the axis thereof inclined upwardly and forwardly from the horizontal, and a wing cellule composing a series of aerofoils disposed in the propeller displacement flow at angles of incidence relative to the flow acting thereon, respectively, the wing cellule so disposed creating a force substantially equal to and balancing the propeller thrust force.

15. In an airplane, a propeller mounted to deliver a thrust acting in a direction approximately midway between the vertical and the horizontal, and a wing cellule comprising aerofoils disposed in the propeller displacement flow at angles of incidence relative to the flow acting thereon, respectively, said aerofoils adjustable to vary the angles of incidence relative to the flow and adapted at certain angles of incidence to create a force by the action of the flow thereon substantially equal to and balancing the propeller thrust force.

16. In an airplane, a propeller mounted to deliver a thrust acting in a direction substantially midway between the horizontal and the vertical, and a supporting surface disposed in the displacement flow at an angle of incidence relative to the flow acting thereon, said supporting surface adjustable to vary the angle of incidence to the flow and adapted at a certain angle of incidence to create a force substantially equal to and balancing the propeller thrust force, while at certain other angles of incidence creating a force less than the thrust force.

17. In an airplane, a normally horizontally disposed fuselage, propellers mounted at opposite sides of said fuselage to rotate in opposite directions and maintain the lateral equilibrium of the airplane, said propellers mounted on axis inclined upwardly and forwardly at an angle to the longitudinal axis of the fuselage, a supporting surface adjustably mounted on the fuselage and having the major area thereof disposed in the displacement flow from said propellers and creating a force by the action of the flow thereon substantially equal to and balancing the thrust force developed by the propellers, the force created by the supporting surface and the propeller thrust force having vertical lift components which combined develop a resultant lift for imparting vertical translational movement to the airplane.

18. In an airplane, a normally horizontally disposed fuselage, propellers mounted at opposite sides of the longitudinal axes thereof to rotate in opposite directions and maintain the lateral equilibrium of the air plane, said propellers mounted on axis inclined upwardly and forwardly to an angle to the normal horizontal axis of the fuselage, a supporting surface adjustably mounted on the fuselage and having the major area thereof disposed in the propeller displacement flow at an angle of incidence relative to the flow acting thereon and creating a force by the action of the flow thereon substantially equal to and balancing the propeller thrust force to maintain the longitudinal equilibrium of the airplane, the force created by the supporting surface and the propeller thrust force each having a vertical component which combined develop a resultant vertical lift for vertical translation of the airplane with the fuselage in substantially normal horizontal position, the said supporting surface adjustable for varying the angle of incidence to reduce the force created thereby below the thrust force and thereby increase the tractive effect of the thrust force for horizontal translational movement to the airplane.

19. In an airplane, a propeller mounted to deliver a thrust having a vertical component and a horizontal component, an aerofoil disposed in the propeller displacement flow and acted upon thereby to create an additional force having a horizontal component acting in a direction opposite to the horizontal thrust component and substantially balancing the same.

20. In an airplane, a propeller mounted to deliver a thrust having a vertical component and a horizontal component, an aerofoil disposed with the major area thereof in the propeller displacement flow at an angle of incidence thereto and acted upon thereby to create a force having a vertical component and a horizontal component, the horizontal component of the force created by the aerofoil acting in a direction opposite to the horizontal propeller thrust but substantially equal to and balancing the same, and the combined vertical components of said force and the propeller thrust developing a vertical lift for imparting vertical translational movement to the airplane.

21. An airplane of the vertical ascent type, embodying a propeller and a supporting surface mounted disposed within the propeller displacement flow and acted upon thereby so as to develop aerofoil forces substantially equal to and balancing the propeller thrust forces to sustain the airplane, and means for tilting the airplane in flight to shift the position of the propeller and supporting surface forces to cause substantial horizontal translational movement of the airplane.

22. In an airplane, propellers mounted in fixed position to deliver a thrust having a vertical component and a horizontal component, a supporting surface disposed with the major area thereof in the displacement flow from said propellers and acted upon thereby to create an additional force substantially balancing the propeller thrust, and said supporting surface adjustable independently of said propellers to vary the angle of incidence thereof in the displacement flow.

23. In an airplane, a normally horizontally disposed fuselage, propellers mounted thereon in fixed position to deliver a thrust having a vertical component and a horizontal component, a supporting surface mounted on said fuselage disposed with the major area within and acted upon by the propeller displacement flow to create an additional force substantially balancing the propeller thrust, and said supporting surface adjustable on the fuselage independently of said propellers to vary its angle of incidence in the flow and vary the force created thereby.

24. In an airplane, a fuselage, propellers mounted on opposite sides thereof in fixed position to deliver a thrust having a vertical component and a horizontal component, a supporting surface mounted on the fuselage with its major area within and acted upon by the propeller displacement flow to create a force substantially balancing the propeller thrust, and the said aerofoil adjustable on the fuselage independently of the propellers to change its angle of incidence and reduce the force created thereby.

25. In an airplane, a normally horizontally disposed fuselage, a truss structure extending from opposite sides of said fuselage, propellers mounted on said truss structure disposed at opposite sides of said fuselage in fixed position for rotation around axis inclined upwardly and forwardly to the horizontal, drive mechanism for said propellers, a supporting surface mounted on the fuselage in position with the major area thereof disposed within and acted upon by the displacement flow from said propellers, and the said supporting surface adjustable independently of the propellers and drive mechanism therefor to vary the angle of incidence thereof in the displacement flow.

Signed at Ithaca, New York, this 18th day of August, 1923.

RANDOLPH F. HALL.